United States Patent
Selvaraj

(10) Patent No.: US 10,362,499 B2
(45) Date of Patent: Jul. 23, 2019

(54) METHOD, APPARATUS AND SYSTEM FOR NETWORK COVERAGE DETECTION

(71) Applicant: NOKIA SOLUTIONS AND NETWORKS OY, Espoo (FI)

(72) Inventor: Ramakrishnan Selvaraj, Bangalore (IN)

(73) Assignee: NOKIA SOLUTIONS AND NETWORKS OY, Espoo (FI)

( * ) Notice: Subject to any disclaimer, the term of this patent is extended or adjusted under 35 U.S.C. 154(b) by 0 days.

(21) Appl. No.: 15/123,775

(22) PCT Filed: Mar. 7, 2014

(86) PCT No.: PCT/EP2014/054463
§ 371 (c)(1),
(2) Date: Sep. 6, 2016

(87) PCT Pub. No.: WO2015/131956
PCT Pub. Date: Sep. 11, 2015

(65) Prior Publication Data
US 2017/0188245 A1 Jun. 29, 2017

(51) Int. Cl.
*H04W 24/04* (2009.01)
*H04W 24/10* (2009.01)
*H04W 4/02* (2018.01)
*H04W 16/18* (2009.01)
*H04W 48/16* (2009.01)

(52) U.S. Cl.
CPC .............. *H04W 24/04* (2013.01); *H04W 4/02* (2013.01); *H04W 16/18* (2013.01); *H04W 24/10* (2013.01); *H04W 48/16* (2013.01)

(58) Field of Classification Search
CPC ....... H04W 4/02; H04W 16/18; H04W 24/02; H04W 64/00; H04W 88/005
See application file for complete search history.

(56) References Cited

U.S. PATENT DOCUMENTS

| | | | |
|---|---|---|---|
| 7,457,633 B2* | 11/2008 | Scheinert | H04W 84/14 370/328 |
| 2003/0061009 A1* | 3/2003 | Davis | H04W 16/18 702/189 |
| 2004/0152362 A1 | 8/2004 | Carter et al. | |

(Continued)

FOREIGN PATENT DOCUMENTS

WO WO 2011/068583 A1 6/2011

OTHER PUBLICATIONS

International Search Report & Written Opinion dated Jan. 22, 2015 corresponding to International Patent Application No. PCT/EP2014/054463.

*Primary Examiner* — Kathy W Wang-Hurst
*Assistant Examiner* — Ernest G Tacsik
(74) *Attorney, Agent, or Firm* — Squire Patton Boggs (US) LLP

(57) ABSTRACT

A method for a telecommunications network includes: identifying a prior coverage area of a subscriber based on a location of a last communication made by the subscriber; identifying a next coverage area of the subscriber; identifying a reduced coverage area of the subscriber based on the prior coverage area and the next coverage area of the subscriber; and displaying, at an apparatus, at least one additional subscribe in the reduced coverage area.

9 Claims, 6 Drawing Sheets

(56) References Cited

U.S. PATENT DOCUMENTS

| | | | |
|---|---|---|---|
| 2004/0198426 A1* | 10/2004 | Squibbs | H04W 99/00 455/555 |
| 2004/0203855 A1 | 10/2004 | Veerasamy et al. | |
| 2005/0054339 A1 | 3/2005 | Merritt | |
| 2008/0102809 A1* | 5/2008 | Beyer | G01C 21/00 455/420 |
| 2011/0153808 A1* | 6/2011 | Byun | H04W 24/02 709/224 |
| 2012/0071157 A1* | 3/2012 | Markoulidakis | H04W 24/08 455/423 |
| 2012/0178376 A1 | 7/2012 | Jain et al. | |

* cited by examiner

FIG 6

| Prior Cell Sac Name | Prior LAC ID | Prior CELL/Sac ID | Technology in Prior Location | Number of Calls missed | Distinct Subscribers |
|---|---|---|---|---|---|
| TAMIL_NADU_SIDUL_Sec5 | 209 | 2165 | 3G | 25 | 20 |
| TAMIL_NADU_SIDUL_Sec2 | 209 | 2162 | 3G | 25 | 18 |
| TAMIL_NADU_SIDUL_Sec3 | 209 | 2613 | 3G | 22 | 13 |
| TAMIL_NADU_SIDUL_Sec4 | 209 | 2164 | 3G | 18 | 10 |
| TAMIL_NADU_GHR_Sec1 | 303 | 1631 | 2G | 12 | 9 |
| TAMIL_NADU_GHR_Sec2 | 303 | 1632 | 2G | 10 | 10 |

600

US 10,362,499 B2

METHOD, APPARATUS AND SYSTEM FOR NETWORK COVERAGE DETECTION

FIELD OF TECHNOLOGY

This disclosure relates generally to the field of customer experience management, and more particularly to a method, apparatus and system for improving subscriber experience in a network by identifying areas having network coverage issues.

BACKGROUND

Subscribers in telecommunications networks often face coverage issues in certain areas of the network that render it impossible to utilize the services provided by the network. Such coverage issues can be caused by overcrowding in the network, operating problems within the network and connectivity issues, for example.

When faced with coverage issues, some subscribers/customers may become unsatisfied with their operator service and switch to another operator if the coverage issues are not promptly identified and addressed.

SUMMARY

A method for a telecommunications network is disclosed and includes: identifying a prior coverage area of a subscriber based on a location of a last communication made by the subscriber; identifying a next coverage area of the subscriber; identifying a reduced coverage area of the subscriber based on the prior coverage area and the next coverage area of the subscriber; and displaying, at an apparatus, at least one additional subscriber in the reduced coverage area.

In addition, a method in a telecommunication network including a processor and a memory is provided, the method including: identifying a first coverage area location of a second subscriber based on a last communication made by the second subscriber; identifying when the second subscriber moves to a first non-coverage area location; initiating a call from a first subscriber to the second subscriber, wherein the second subscriber is in the first non-coverage area when the call is initiated; forwarding the call to a forwarding number of the second subscriber; sending to an apparatus the first coverage area location of the second subscriber; identifying when the second subscriber moves to a second coverage area location; generating a missed call or information alert at the second subscriber; sending to the apparatus the second coverage area location of the second subscriber; identifying, at the apparatus, a reduced coverage area based on the first coverage area location and the second coverage area location of the second subscriber; and identifying at least one additional subscriber in the reduced coverage area.

An apparatus is also disclosed and includes a memory, and a processor, wherein the apparatus is configured to identify a reduced coverage area in a telecommunications network and a plurality of subscribers in the reduced coverage area.

Furthermore, a system is disclosed and includes a customer experience management module, an operation support system in communication with the customer experience management module, and a traffic event collection module in communication with the customer experience management module, wherein the operation support system and the traffic event collection module are in communication with a telecommunications network.

DESCRIPTION OF THE SEVERAL VIEWS OF THE DRAWINGS

To aid in the proper understanding of the present disclosure, reference should be made to the accompanying drawings, wherein:

FIG. 6 is an example report displayed in accordance with the present disclosure.

DETAILED DESCRIPTION

It is not uncommon for subscribers to occasionally experience network coverage issues that prevent them from utilizing telecommunication services such as voice calls, SMS, and/or Web browsing, for example. To address such coverage issues, operators may analyze network radio counters from the OSS indicating the number of dropped/effected calls and/or based on customer complaints. Based on this information, the operator may conduct an RF Drive Test, for example, to measure and assess the coverage, capacity, and Quality of Service of the network. However, this solution does not provide the operator with the number of customers affected by the outage, or the identity of the customers affected by the outage. The present disclosure provides a more efficient and accurate method, apparatus and system for identifying the customers affected by coverage issues, so that the operator can take steps to remediate the situation and restore service.

Figure 1:
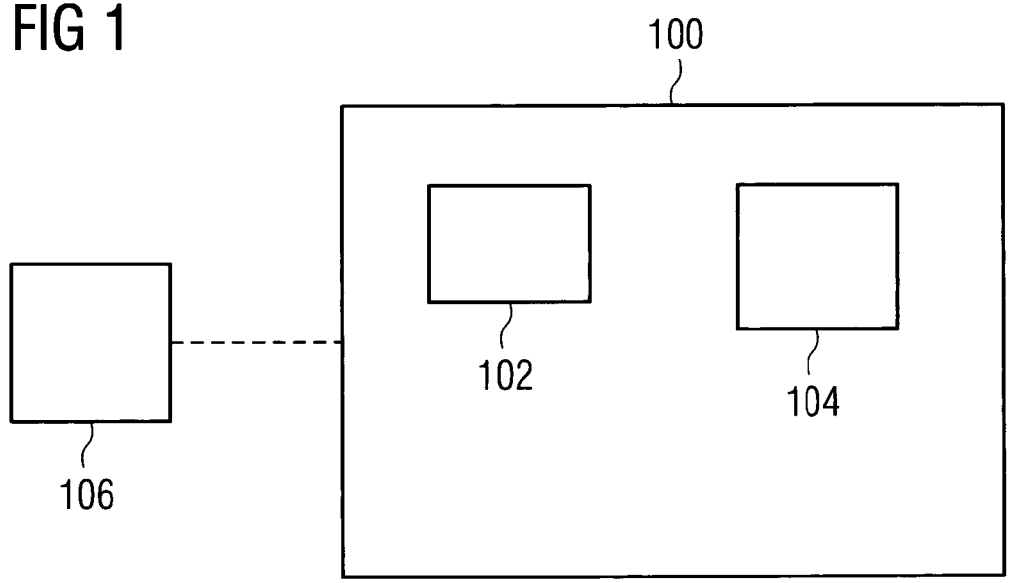
FIG. 1 is a diagram showing an apparatus in accordance with the present disclosure.

Specifically, reference is made to FIG. 1, which depicts an apparatus 100 in accordance with the present disclosure. The apparatus 100 includes a memory 102, and a processor 104, where the apparatus 100 is in communication with and/or part of a telecommunications network 106. Although not described in detail, it is appreciated that the apparatus 100 can include additional elements. As will be described in further detail below, the apparatus 100 is configured to identify a reduced coverage area in the telecommunications network 106 and a plurality of subscribers in the reduced coverage area. In the present disclosure, the apparatus 100 is a customer experience management (CEM) module, although it is possible that the apparatus could be any other similar module/equipment having a processor and memory and configured to communicate with a telecommunications network, or part of a larger apparatus that is part of a telecommunications network.

As will be described in detail below, the CEM module 100, by its processor 102, is configured to identify a prior coverage area of a subscriber of a plurality of subscribers based on a location of a last communication made by the subscriber, identify a next coverage area of the subscriber, identify the reduced coverage area of the subscriber based on the prior coverage area and the next coverage area of the subscriber, and display at least one additional subscriber of the plurality of subscribers in the reduced coverage area.

Figure 2:
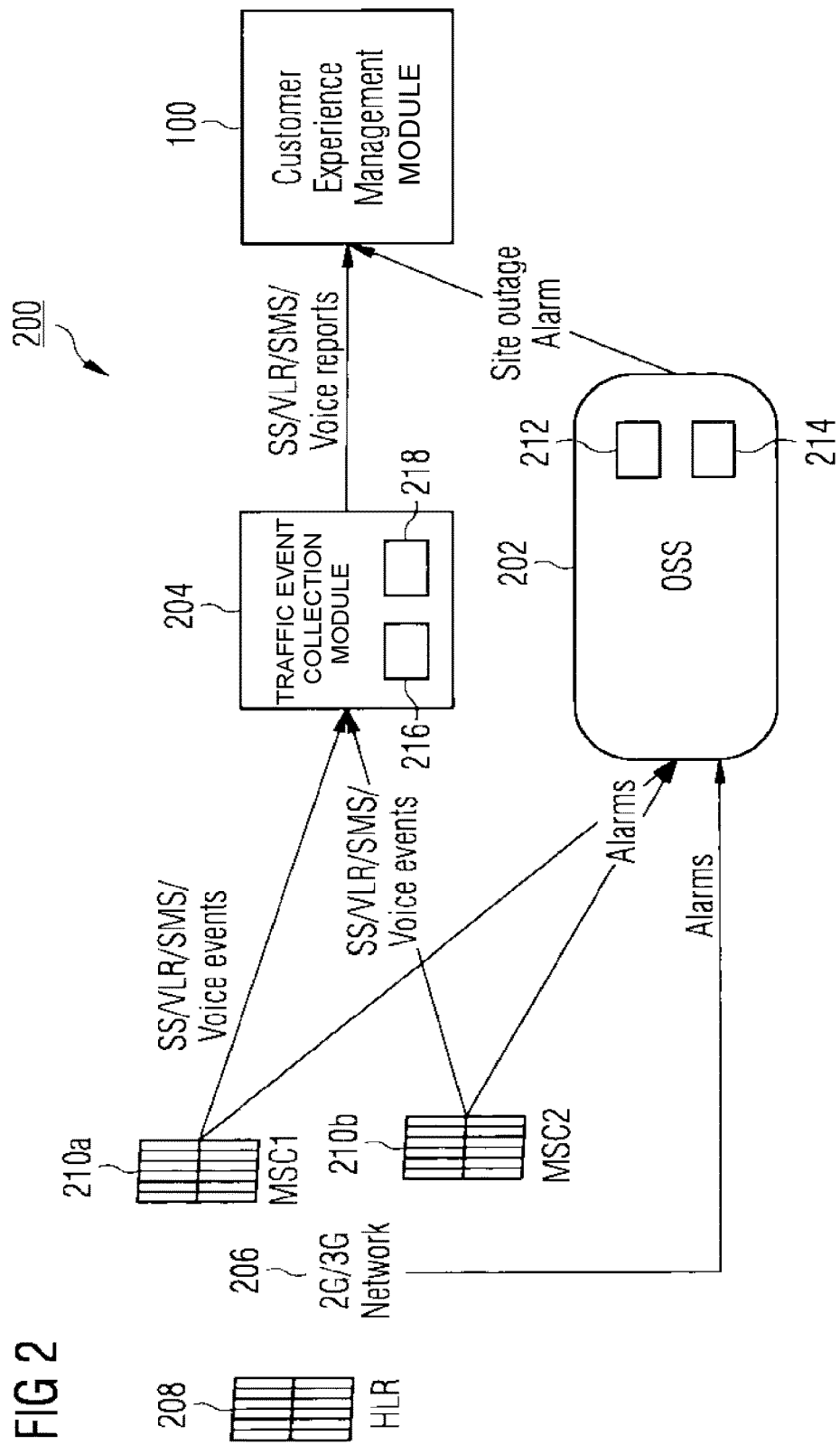
FIG. 2 is a diagram showing a system in accordance with the present disclosure.

Turning now to FIG. 2, the CEM module 100 is part of a larger system 200, the system including the CEM module, an operation support system 202 (OSS) in communication with the CEM module, and a traffic management tool or traffic event collection module 204 in communication with the CEM module. As seen in FIG. 2, the OSS 202 and the traffic event collection module 204 are in communication with a telecommunications network 206. As known by those of ordinary skill in the art, the telecommunications network 206 includes several components, such as, but not limited to, a Home Location Register (HLR) 208 and at least one Mobile Switching Center (MSC) 210a and 210b. In accordance with the present disclosure, the traffic event collection module 204 and the OSS 202 are in communication with MSC1 210a and MSC2 210b, respectively, in the telecommunications network 206.

In the present disclosure, the OSS 202 includes a processor 212 and a memory 214, and is configured to, among other things, communicate with the network 206 to collect information regarding downtime cell areas within the network. The CEM 100 is configured, among other things, to receive the information from the OSS 202. Further, the traffic event collection module 204 also includes a processor 216 and a memory 218, and is configured to, among other things, communicate (either directly or through probes [not shown]) with the MSC1 210a and MSC2 210b to collect service, SMS, VLR and Voice events occurring at the subscriber level within the network 206 and send them to the CEM 100. The OSS 202 and traffic event collection module 204 are not limited to the components and/or configurations described above.

As will be described in further detail below in accordance with the method shown in FIG. 3, in the present system 200, the CEM 100, by its processor 102, is configured to identify a first coverage area location of a second subscriber based on a last communication made by the second subscriber; identify when the second subscriber moves to a first non-coverage area location; receive, from the traffic event collection module 204, the first coverage area location of the second subscriber; identify when the second subscriber moves to a second coverage area location; receive, from the traffic event collection module, the second coverage area location of the second subscriber; identify a reduced coverage area based on the first coverage area location and the second coverage area location of the second subscriber; and identify at least one additional subscriber in the reduced coverage area. The system 200 is therefore configured to identify a reduced coverage area in the network 206, and based on the reduced coverage area location, identify subscribers within the reduced coverage area. With this information, the CEM 100 can provide reports/alerts to a network operator that allow the operator to address coverage issues within the network, as described below in additional detail.

Figure 3:
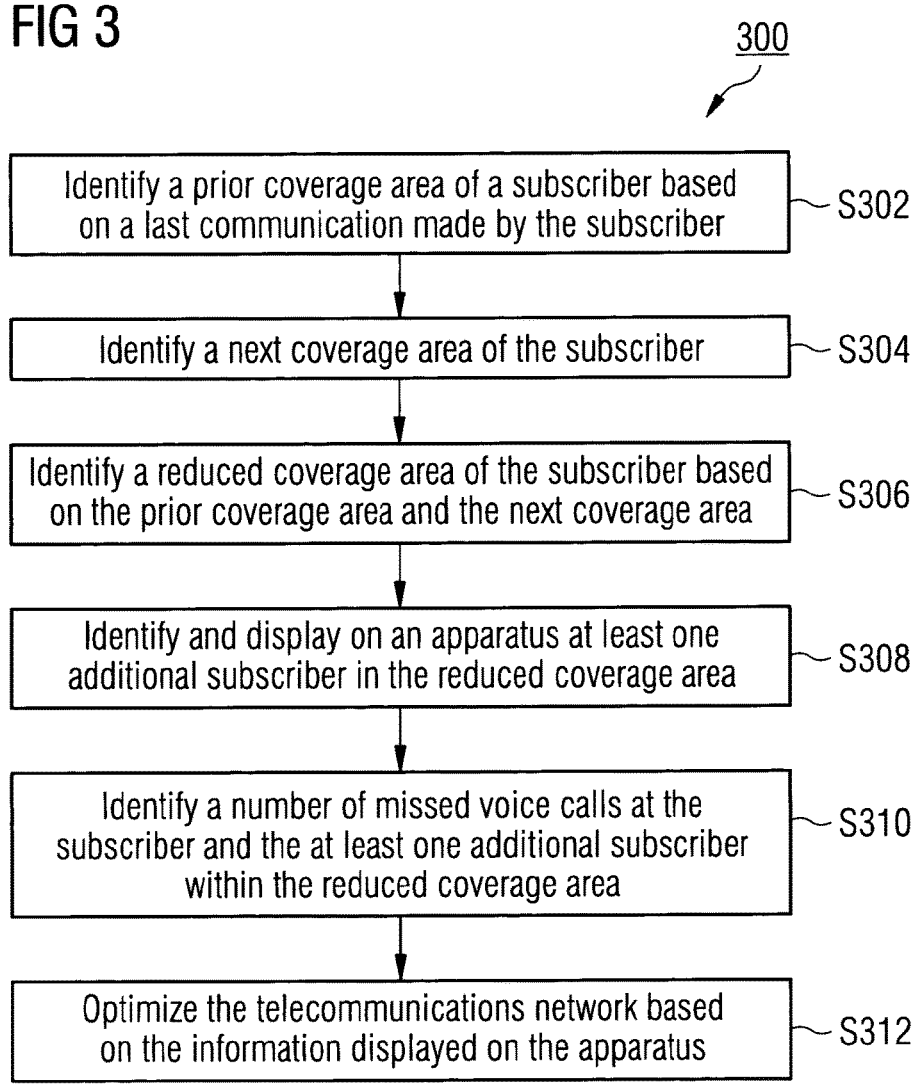
FIG. 3 is a flow chart showing a method for subscriber management in accordance with the present disclosure.

Turning next to FIG. 3, a method 300 performed by the system 200 is described in detail. Specifically, at S302, a prior coverage area of a subscriber based on a location of a last communication made by the subscriber is identified. Although not limited to the following examples, the last communication made by the subscriber can be one of a location update request, an SMS, a voice transaction, and a data transaction. At S304, a next coverage area of the subscriber is identified. At S306, a reduced coverage area of the subscriber is identified, the reduced coverage area being based on the prior coverage area and the next coverage area of the subscriber. At S308, at least one additional subscriber in the reduced coverage area is displayed on an apparatus. In accordance with the present disclosure, the apparatus is the CEM 100, which includes a display screen or graphical user interface (GUI) configured to display, among other things, the subscribers (i.e., the second subscriber and additional subscribers) located in the reduced coverage area. The reduced coverage area could be displayed on the CEM 100 using a mapping application, such as Google Maps® or Open Street Maps®, for example. The map (shown in FIG. 5 and described again below) could indicate the location of the reduced coverage area and the locations of the subscribers within the affected reduced coverage area. As will be described in further detail below, the CEM 100 is configured to identify the prior coverage area, the next coverage area and the reduced coverage area. The method 300 can also include, at S310, identifying a number of voice calls missed by the subscriber and the at least one additional subscriber within the reduced coverage area. Based on the information received and displayed at the CEM, the operator can, at S312, optimize the telecommunications network based on the identification of the reduced coverage area.

Figure 4:
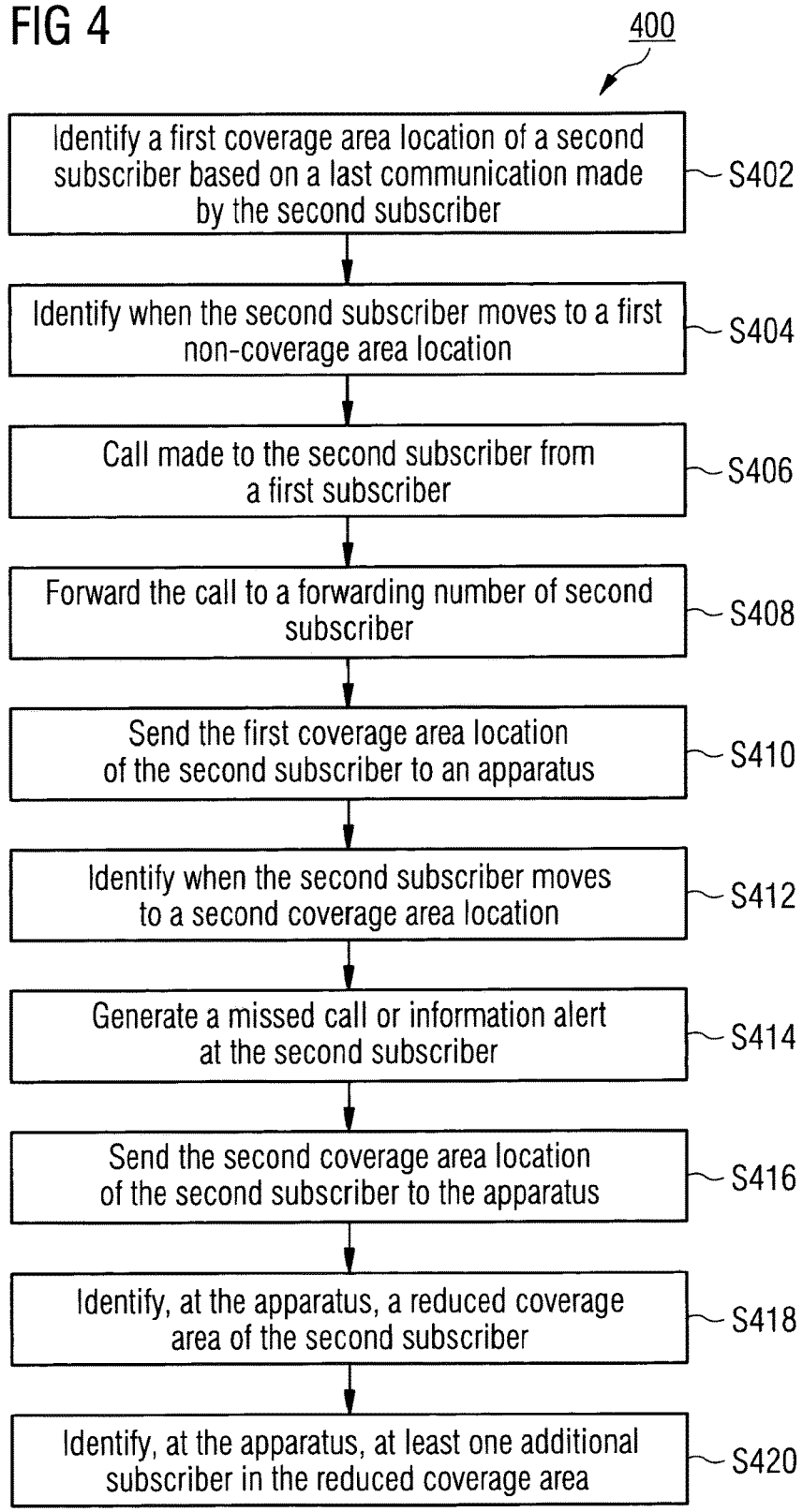
FIG. 4 is a flow chart showing another method for subscriber management in accordance with the present disclosure.

Referring now to FIG. 4, a method 400 is provided in accordance with the present disclosure. In the method 400, at S402, a first coverage area location of a second subscriber is identified, the first coverage area location being based on a last communication made by the second subscriber. The last communication made by the second subscriber may be, for example, one of a location update request, an SMS, a voice transaction, and a data transaction, although this list is non-limiting. At S404, the method identifies when the second subscriber moves to a first non-coverage area location. At S406, a call is initiated/made to the second subscriber from a first subscriber, wherein the second subscriber is in the first non-coverage area when the call is initiated. Because the second subscriber is in the first non-coverage area when the call is initiated, at S408, the call is forwarded to a forwarding number or Voicemail of the second subscriber. At S410, the first coverage area location of the second subscriber is sent to an apparatus (in this disclosure, the apparatus is the CEM 100). At S412, it is identified when the second subscriber moves to a second coverage area location, at which time a missed call or information alert is generated at the second subscriber (S414). The information alert may be a voicemail alert, a location update alert, an SMS message or other voice/data notification recognizable by the second subscriber, for example. The second coverage area location of the second subscriber is then sent to the CEM 100 at S416. Based on the on the first coverage area location and the second coverage area location of the second subscriber, the CEM 100 identifies a reduced coverage area at S418. With the location of the reduced coverage area identified, the CEM 100 can then identify, at S420, at least one additional subscriber in the reduced coverage area.

In accordance with the method 400, in the present disclosure the CEM 100, via its data aggregation layer (not shown) and the processor 102, is configured to identify the first coverage area location, the second coverage area location and the reduced coverage area. Specifically, the traffic event collection module 204 is configured such that when the second subscriber is in the first non-coverage area, it can identify when a call is made to the second subscriber from the first subscriber, and can then identify that the call has been forwarded to a forwarding number of the second subscriber. The traffic event collection module 204 then sends this information (in the form of a report, list, table, or other supplementary reporting medium) to the CEM 100. To further assist the CEM 100, the OSS 202 is configured to provide reports/alerts to the CEM regarding the at least one additional subscriber in the reduced coverage area. Specifically, the OSS 202 can provide site outage alarms/alerts to the CEM 100, which can assist the CEM in determining whether the coverage problem is temporary or permanent. Such reports/alerts from the OSS 202 and traffic event collection module 204 can be automatically sent to the CEM 100 based on operator settings, or can be requested by the operator.

When the CEM 100 receives the information from the OSS 202 and the traffic event collection module 204 (in the form of, for example, reports, alerts, email, trouble ticket, etc.), it correlates the information to determine the reduced coverage area in which the second subscriber was located. Using this information, the CEM 100 can then locate additional subscribers that are also in the reduced coverage area and alert network operators so that troubleshooting actions to improve coverage in the reduced coverage area. Once the additional subscribers are identified, the number of missed calls can be recorded and sent to the operators for troubleshooting purposes. For example, the CEM 100 can utilize the additional subscriber information to proactively track the additional subscribers in the reduced coverage area before they contact customer care with coverage issues/problems. This information can also be utilized to identify call reselection issues, such as when a subscriber moves from 2G to 3G networks, or vice versa. In another example scenario, once the CEM 100 identifies the reduced coverage area, subscribers outside of but nearing the reduced coverage area can be identified, such that preemptive corrective actions can be taken prior to these subscribers entering the reduced coverage area. The information provided by the CEM 100 can also be used by the operator to determine if addition cell sites should be added to the network 206, or if other network parameter changes should be made.

Figure 5:
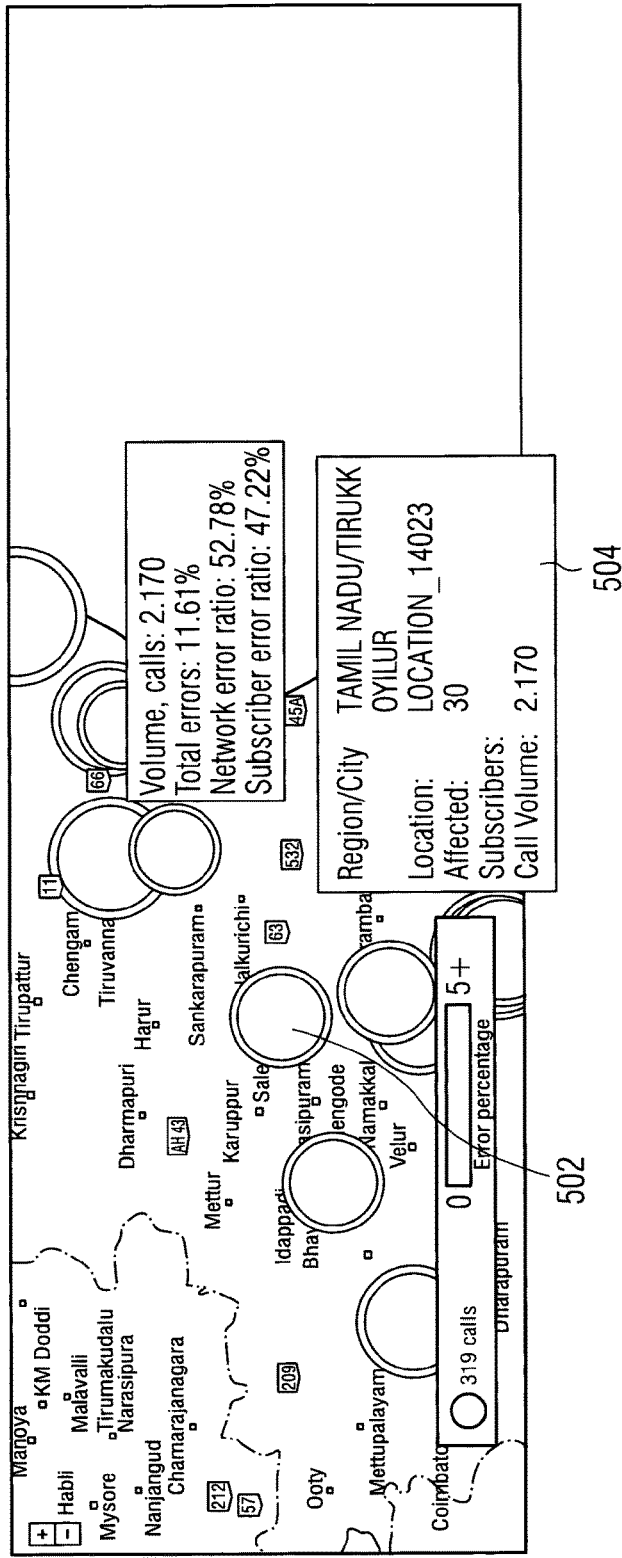
FIG. 5 is a map showing an example coverage area in accordance with the present disclosure.

Turning now to FIG. 5, a map 500 showing the reduced coverage area 502 is provided. The processor 102 of the CEM 100 can include a mapping application, such as Google Maps®, configured to plot and display the locations of, among other things, the reduced coverage area 502 and subscribers located within the reduced coverage area. In the present disclosure, for example, the CEM 100 is integrated with a Google Maps® feature that shows the location of subscribers within the reduced coverage area 502 based on latitude/longitude values provided by the network operator and in accordance with their network planning strategy. As briefly mentioned above, the map 500 can be displayed on the CEM 100 after the location of the reduced coverage area 502 is identified. The map 500 can also include detailed information 504 about the location of the reduced coverage area 502, the number of subscribers affected and the number of missed calls within the reduced coverage area, for example. Additional or less subscriber/network information can be displayed on the map 500 based on operator preference.

As seen in FIG. 6, based on the information received from the OSS 202 and the traffic event collection module 204, the CEM 100 can compile reports 600 that display, for example, the number of calls missed in the reduced coverage area, the number of affected subscribers in the reduced coverage area, and nearby network cell site outages. Such information can inform the network operator as to whether the problem in the network is temporary or permanent. In addition, based on this information, the operator can trigger actions to be performed by network operations and planning teams, such as optimizing and resolving the network problem. Further, such information compiled by the CEM can be sent to customer service agents so they can specifically address and answer customer complaints related to the reduced coverage area.

The present apparatus, system and method can be applied in several use cases, some of which will be described in further detail herein. For example and as described above with reference to FIG. 5, in the present disclosure, the reduced coverage area and number of subscribers affected can be shown in a mapping application such as Google Maps®. In addition, the information compiled by the CEM 100 regarding the reduced coverage area and the number of affected subscribers therein can be provided to network operators in the form of reports with drill downs that provide information at the cell level. The reduced coverage area and affected subscriber information can also be utilized using a search on MSISDN (Mobile Subscriber Integrated Services Digital Network-Number), where network operators can use MSISDN to search subscribers and determine if they are located in or near to the reduced network coverage area. Network operators can also use the data from the CEM 100 regarding reduced coverage area to group affected corporate or VIP subscribers. Specifically, the network operator can provide the CEM 100 with a list of VIP or corporate customers (based on their MSISDN/IMSI, for example), and using this information, the CEM 100 can determine if any of the VIP/corporate customers are located in the reduced coverage area or nearing the coverage area, by comparing the MSISDN/IMS provide by the operators with those located in the reduced coverage area. If the numbers match, the CEM 100 can notify the operator and the operator can send out a preemptive alert to the subscribers that they are in or nearing a reduced coverage area and can expect delays. Additional use cases are also envisioned, and therefore the examples provided herein are not to be considered limiting in any way.

The present disclosure provides an efficient and effective apparatus, method and system for identifying a reduced coverage area in a network, and more specifically, for identifying subscribers located in the reduced coverage area. Based on this knowledge, network operators can take actions to troubleshoot coverage/customer issues within the reduced coverage area. The present apparatus, system and method enable identification of reduced coverage areas and enable operators to take corrective action to improve operations within the reduced coverage area.

Embodiments of the present invention may be implemented in software (executed by one or more processors), hardware (e.g., an application specific integrated circuit), or a combination of software and hardware. In an example embodiment, the software (e.g., application logic, an instruction set) is maintained on any one of various conventional non-transitory computer-readable media. In the context of this document, a "non-transitory computer-readable medium" may be any media or means that can contain, store, communicate, propagate or transport the instructions for use by or in connection with an instruction execution system, apparatus, or device, such as a computer. A non-transitory computer-readable medium may comprise a computer-readable storage medium (e.g., memory or other device) that may be any media or means that can contain or store the instructions for use by or in connection with an instruction execution system, apparatus, or device, such as a computer. As such, the present invention includes a computer program product comprising a computer-readable storage medium bearing computer program code embodied therein for use with a computer, the computer program code comprising code for performing any of the methods and variations thereof as previously described. Further, the present invention also includes an apparatus which comprises one or more processors, and one or more memories including computer program code, wherein the one or more memories and the computer program code are configured, with the one or more processors, to cause the apparatus to perform any of the methods and variations thereof as previously described.

If desired, the different functions discussed herein may be performed in a different order and/or concurrently with each other. Furthermore, if desired, one or more of the above-described functions may be optional or may be combined.

Although various aspects of the invention are set out in the independent claims, other aspects of the invention comprise other combinations of features from the described embodiments and/or the dependent claims with the features of the independent claims, and not solely the combinations explicitly set out in the claims.

It is also noted herein that while the above describes example embodiments of the invention, these descriptions should not be viewed in a limiting sense. Rather, there are several variations and modifications which may be made without departing from the scope of the present invention as defined in the appended claims.

One having ordinary skill in the art will readily understand that the invention as discussed above may be practiced with steps in a different order, and/or with hardware elements in configurations which are different than those which are disclosed. Therefore, although the invention has been described based upon these preferred embodiments, it would be apparent to those of skill in the art that certain modifications, variations, and alternative constructions would be apparent, while remaining within the spirit and scope of the invention. In order to determine the metes and bounds of the invention, therefore, reference should be made to the appended claims.

The following abbreviations that may be found in the specification and/or the drawing figures are defined as follows:
CEM Customer Experience Management
HLR Home Location Register
MSC Mobile Switching Center
OSS Operation Support System

The invention claimed is:

1. A method in a telecommunications network, wherein the telecommunications network comprises a processor and a memory, the method comprising:
   identifying a first coverage area location of a second subscriber based on a last communication made by the second subscriber;
   sending to an apparatus the first coverage area location of the second subscriber;
   identifying when the second subscriber moves to a first non-coverage area location, wherein the first non-coverage area location is an area in which the second subscriber has no coverage;
   initiating a call to the second subscriber from a first subscriber, when the second subscriber is in the first non-coverage area location;
   forwarding the call to a forwarding number of the second subscriber;
   sending to the apparatus information of the forwarded call;
   identifying when the second subscriber moves to a second coverage area location;
   generating an alert of a missed call at the second subscriber once the second subscriber enters the second coverage area location;
   sending to the apparatus the second coverage area location of the second subscriber once the second subscriber enters the second coverage area location;
   identifying, at the apparatus, a reduced coverage area location based on information of the forwarded call, the first coverage area location, and the second coverage area location of the second subscriber, wherein the reduced coverage area location comprises an area having a reduced network coverage; and
   identifying, at the apparatus, at least one additional subscriber in the reduced coverage area.

2. The method of claim 1, wherein the last communication made by the second subscriber is one of a location update request, an short message service, a voice transaction, and a data transaction.

3. The method of claim 1, wherein the alert is one of a missed call alert and a location update.

4. The method of claim 1, further comprising displaying, at the apparatus, the reduced coverage area on a mapping application.

5. The method of claim 1, wherein the apparatus is a customer experience management module.

6. The method of claim 5, wherein the customer experience management module is configured to identify the first coverage area location, the second coverage area location, and the reduced coverage area.

7. A system comprising:
   a customer experience management module;
   an operation support system in communication with the customer experience management module; and
   a traffic event collection module in communication with the customer experience management module;
   wherein the operation support system and the traffic event collection module are in communication with a telecommunications network,
   wherein the customer experience management module comprises a memory and a processor, the processor configured to:
   identify a first coverage area location of a second subscriber based on a last communication made by the second subscriber;
   identify when the second subscriber moves to a first non-coverage area location, wherein the first non-coverage area location is an area in which the second subscriber has no coverage;
   receive, from the traffic event collection module, information of a forwarded call, wherein the information of the forwarded call is information of a call initiated to the second subscriber when the second subscriber is in the first non-coverage area location that has been forwarded to a forwarded number of the second subscriber;
   receive, from the traffic event collection module, the first coverage area location of the second subscriber;
   identify when the second subscriber moves to a second coverage area location;
   receive, from the traffic event collection module, the second coverage area location of the second subscriber once the second subscriber enters the second coverage area;
   identify a reduced coverage area location based on information of the forwarded call, the first coverage area location, and the second coverage area location of the second subscriber, wherein the reduced coverage area location comprises an area having a reduced network coverage; and identify at least one additional subscriber in the reduced coverage area.

8. The system of claim 7, wherein the traffic event collection module includes a memory and a processor, the processor configured to:
  identify when a call is initiated by a first subscriber to the second subscriber, wherein the second subscriber is in the first non-coverage area; and
  identify that the call has been forwarded to a forwarding number of the second subscriber.

9. The system of claim 7, wherein the operation support system comprises a memory and a processor, the processor configured to provide reports to the customer experience management module regarding the reduced coverage area and the at least one additional subscriber in the reduced coverage area.

\* \* \* \* \*